United States Patent [19]  [11] 4,052,501
Kreahling et al.  [45] Oct. 4, 1977

[54] TREATMENT OF POLYESTER FILAMENTS WITH AROMATIC ISOCYANATE MIXTURE

[75] Inventors: Robert P. Kreahling, Fairfield; Donald J. Casey, Ridgefield, both of Conn.; David Z. Goldenberg, Mentor, Ohio

[73] Assignee: American Cyanamid Company, Stamford, Conn.

[21] Appl. No.: 281,248

[22] Filed: Aug. 16, 1972

[51] Int. Cl.² ............................................. D01D 5/12
[52] U.S. Cl. .............................. 264/290 T; 264/137; 427/171
[58] Field of Search ................ 117/7, 137, 66, 76 T, 117/47 A, 47 R, 161 ZA, 135.5, 138.8 F, 139.5 CQ, DIG. 7; 264/210 F, 211, 176 F, 137, 290 T; 260/75 T; 8/115.5; 57/164; 152/359; 161/5; 156/229, 330, 315; 427/171

[56] References Cited

U.S. PATENT DOCUMENTS

| | | | |
|---|---|---|---|
| 2,994,671 | 8/1961 | Thompson | 117/7 |
| 3,196,035 | 7/1965 | Yanagihara et al. | 117/47 A |
| 3,234,067 | 2/1966 | Krysiak | 117/7 |
| 3,297,467 | 1/1967 | Macura et al. | 117/138.8 F |
| 3,297,468 | 1/1967 | Macura et al. | 117/138.8 F |
| 3,329,758 | 7/1967 | Morgan et al. | 264/211 |
| 3,335,209 | 8/1967 | Morgan et al. | 264/211 |
| 3,383,242 | 5/1968 | Macura et al. | 117/138.8 F |
| 3,549,740 | 12/1970 | Schwarz | 264/137 |
| 3,561,937 | 2/1971 | Matthews | 264/178 F |
| 3,703,426 | 11/1972 | Larson et al. | 117/47 R |
| 3,755,165 | 8/1973 | Bhakuni et al. | 117/138.8 F |

Primary Examiner—Jay H. Woo
Attorney, Agent, or Firm—Philip Mintz

[57] ABSTRACT

Polyester filaments treated with aromatic isocyanate to provide improved adhesion to rubber also have improved fatigue resistance and improved drawability provided the aromatic isocyanate used is a mixture of 50 to 90% di-functional aromatic isocyanates and the remainder higher than di-functional aromatic isocyanates.

6 Claims, No Drawings

TREATMENT OF POLYESTER FILAMENTS WITH AROMATIC ISOCYANATE MIXTURE

This invention relates to polyester reinforcement for rubber articles, such as tires, belts, hose, and the like. More particularly, it relates to a treatment for polyester fibers to improve the adhesion thereof to rubber and to improve the fatigue resistance thereof in use in the rubber articles wherein they are to be used as reinforcement.

Prior to the present invention, it was known to apply aromatic isocyanate containing at least two isocyanate groups per molecule to polyester fibers prior to embedding such fibers, in the form of yarn, cord, or fabric, in rubber to improve the adhesion of the polyester to the rubber. Frequently, such isocyanate-treated polyester fibers are additionally treated with an RFL or other elastomer-containing dip prior to embedding in rubber to further improve the adhesion, as described in Knowles et al. U.S. Pat. No. 2,990,313 issued June 27, 1961; and Stevens U.S. Pat. No. 3,090,716 issued May 21, 1963 for example.

In the preparation of such isocyanate-treated polyester fibers, it has been found that improved adhesion can be achieved when the isocyanate is applied to the polyester fibers prior to drawing the fibers in steam, as taught by Schwarz U.S. Pat. No. 3,549,740 issued Dec. 22, 1970. While steam-drawing is a known technique for orienting synthetic fibers, generally it is preferred when possible, to use dry heat and to orient the synthetic fibers by drawing them in contact with heated surfaces, such as heated rolls, heated platens, heated draw pins, etc. Unfortunately, as pointed out in said Schwarz patent, dry heat drawing is not suitable for his process, steam-drawing is essential. In seeking to utilize the generally preferable dry heat drawing process, we have discovered that high adhesive strengths and unexpectedly improved fatigue resistance can be achieved compared to the steam-drawing process of Schwarz. However, we have also discovered that the dry heat drawing process still suffers from poor operability (filament breakage). Surprisingly, we have discovered that the drawability of this dry heat process could be greatly improved provided the isocyanate applied to the polyester filaments prior to drawing was a mixture of 50 to 90% difunctional aromatic isocyanates and the remainder higher than difunctional aromatic isocyanates. Not only does use of this mixture of aromatic isocyanates greatly improve the dry heat drawability of polyester filaments treated therewith so that this generally preferred drawing process can be utilized and the unexpectedly improved fatigue resistance of the end product can be achieved, but we have discovered that higher adhesive strengths are realized than when the difunctional aromatic isocyanate is used alone. Also, use of this mixture of aromatic isocyanates yields products of reduced stiffness which makes the products easier to utilize in the embedding process (e.g. "tire-building" process) and avoids premature fatigue failure of stiffer cords breaking the adhesive bond to the rubber and abrading each other.

It is well known to use filaments of synthetic linear condensation polyester as reinforcement for rubber articles. The term "synthetic linear condensation polyester" refers to a linear polymer comprised of recurring structural units containing, as an integral part of the polymer chain, recurring carbonyloxy groups

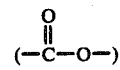

and having a relative viscosity of at least about 25 in a solution of 11 g. of polymer in 100 ml. of a mixed solvent composed of 10 parts by weight of phenol and 7 parts by weight of trichlorophenol. Preferably, the polyester is one of the polymethylene terephthalates described in U.S. Pat. Nos. 2,465,319; 3,051,212; and 3,216,187. Polyethylene terephthalate is the especially preferred commercial polyester at present.

In the process of manufacturing filaments of polyester for use as reinforcement for rubber articles, it is usual to include at some point in the process, at least one drawing step wherein the filaments are stretched or elongated to orient the molecules therein thereby increasing the strength of such filaments. Preferably, such drawing step or steps serve to elongate the filaments to about 4 to 7 times their undrawn length. Numerous means are known for accomplishing such drawing step or steps which can be used in conjunction with the present invention, although it is generally preferred to utilize those means wherein the filaments are heated in air in contact with a heated surface such as heated rolls, heated platens, heated draw pins, etc. which may be heated internally (as by internal electric heaters) or externally (as by radiant heaters) or combinations thereof.

In order to enhance the adhesion of synthetic filaments of rayon or nylon to rubber, it is known to either apply a resorcinol-formaldehyde-latex dip (commonly termed an RFL dip) to such filaments prior to embedding them in the rubber or to use certain rubber adhesion-promoting additives, such as a combination of a formaldehyde-donor (e.g. trimethylolnitromethane, trimethylolacetoaldehyde, hexamethylenetetramine, paraformaldehyde, or hexamethoxymethylmelamine) and a polyhydroxyphenol (e.g. resorcinol or phloroglucinol) with or without hydrated silica. In contrast to the results with rayon or nylon, these techniques do not result in any substantial adhesion enhancement when applied to polyester filaments. However, it is known that enhanced adhesion to rubber can be achieved with these techniques provided the polyester filaments have been treated with certain adhesion promotors, such as polyepoxides, isocyanates, ethyleneureas, etc. The present invention is an improvement on this technology when aromatic isocyanates are used as the pretreatment to enhance the adhesion of polyester filaments to rubber whether or not an RFL or other elastomer-containing dip or rubber adhesion-promoting additives are used.

It had been found that superior results were achieved when the polyester filaments were treated with the aromatic isocyanate prior to drawing and then drawing in the presence of steam (steam-drawing) to react the isocyanate with water on the nascent polyester filament surface during drawing as disclosed in Schwarz U.S. Pat. No. 3,549,740. However, as pointed out in Schwarz, dry heat drawing (wherein the filaments are heated in air in contact with a heated surface in the absence of steam) is unsuitable.

The present invention has for its objects providing an operable dry heat drawing process for stretching isocyanate-pretreated polyester filaments, and producing polyester reinforcement for rubber articles giving improved adhesion to rubber, improved fatigue resistance, and reduced stiffness. Other objects will appear as the more detailed description and exemplification proceeds.

In accordance with the present invention, we have discovered that these objects can be achieved provided the isocyanate applied to the polyester filaments is a mixture of 50 to 90% di-functional aromatic isocyanates and the remainder higher than di-functional aromatic isocyanates. Preferably, such mixture of isocyanates should be applied to the polyester filaments as a solution in a chlorinated hydrocarbon solvent.

The di-functional aromatic isocyanates useful for this invention are those aromatic isocyanates containing exactly two isocyanate groups per molecule, such as methylene-bis(4-phenylisocyanate) dimer and TDI-dimer (wherein one isocyanate from each of two MDI or MDI; toluene-diisocyanate or TDI; MDI-dimer or TDI units react to form an

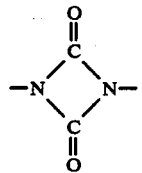

bridge); ethylene-bis-(N-3-isocyanato-4-methylphenylurethane; phenylene-diisocyanate; naphthalene-diisocyanate; 3,3'-dimethyl or dimethoxy-4,4'-bis-phenylene-diisocyanate; 4,4'-bis(2-methyl or methoxyisocyanatophenyl)methane; chlorobenzene diisocyanate; nitrobenzene diisocyanate; xylylene-diisocyanate; dichlorobiphenylene-diisocyanate; etc., and various mixtures thereof.

The higher than di-functional aromatic isocyanates useful for this invention are those aromatic isocyanates containing more than two (namely, three or more) isocyanate groups per molecule, such as polymethylene-polyphenylisocyanate or PAPI [which includes di-methylene-tris(phenylisocyanate) as the trimer, tri-methylene-tetrakis(phenylisocyanate) as the tetramer, etc.]; toluene triisocyanate; triphenylmethane triisocyanate; MDI-trimer and TDI-trimer (wherein one isocyanate from each of three MDI or TDI units react to form an isocyanurate bridge); etc., and mixtures thereof.

The mixture of aromatic isocyanates may be applied to the polyester filaments as a concentrated solution in an inert solvent such as a hydrocarbon, an ether, a ketone, or an ester, although a chlorinated hydrocarbon solvent is preferred. Illustrative of such solvents are toluene, xylene, bis-(2-methoxy-ethyl)ether, 3-pentanone, methyl ethyl ketone, ethyl acetate. Illustrative of the chlorinated hydrocarbon solvents which are preferred are chlorobenzene, dichloroethylene, trichloroethylene, tetrachloroethane, and perchloroethylene. Usually, the amount of this mixture of aromatic isocyanates applied to the polyester filaments results in a coating of 0.05 to 5% on weight of fiber.

It is critical that the isocyanate mixture contain 50 to 90% di-functional aromatic isocyanates and the remainder higher than di-functional aromatic isocyanates. If the isocyanate used is all di-functional aromatic isocyanate, the adhesive strength is significantly lower than when the mixture of this invention is used. If the isocyanate mixture contains too much higher than di-functional aromatic isocyanate and too little di-functional isocyanate, the drawability of the polyester filaments is poor to inoperable in a dry heat drawing process and the fatigue resistance of the product in rubber is poor.

When the isocyanate-treated polyester filaments are to be drawn by a dry heat drawing process wherein the filaments are to be heated and drawn in air in contact with heated surfaces, such as heated rolls, heated platens, heated draw pins, etc., a lubricating finish should be applied to the isocyanate-treated polyester filaments prior to drawing. As taught in our co-pending application Ser. No. 281,247, filed concurrently herewith, it is best to use hydroxy-containing finishes which are applied from a 5 to 20% solution to give a finish coating of 0.02 to 0.4% on weight of fiber and to apply such finish less than one hour prior to drawing. Illustrative of such finishes useful in conjunction with this invention and solvents for forming solutions therefrom are those listed in said copending application.

The invention will be more fully understood by reference to the following examples which are intended to be illustrative and not limitative. All parts and percentages are on a weight basis except where expressly noted.

In these examples, the adhesive strength was measured by the "Ring Peel Adhesion" test as follows. The drawn polyester filaments, in the form of a cord, were dipped in an RFL dip prepared by mixing together 16.6 parts of resorcinol, 14.7 parts of 37% formaldehyde, 1.3 parts of sodium hydroxide, and 332.4 parts of water, aging for 2 hours, then adding 195 parts of a 41% vinyl-pyridine latex and 50 parts of a styrene-butadiene latex, and aging for an additional 24 hours. The cord, after dipping, had a dip pick-up between 4 and 6% on weight of fiber. After application to the cord, the RFL dip was cured at 400° F. for 90 seconds. The cord was then wrapped in three layers around a 1.625-inch diameter mandrel covered with heavy duty aluminum foil painted with rubber cement. The cords in each layer lying side-by-side as close together as possible without overlap. A thin sheet of rubber stock was wrapped around the cord-wrapped mandrel and a covering was applied over the rubber stock to stabilize it during curing and to strengthen it for testing. Next, the mandrel was placed in an autoclave to cure the rubber at elevated temperature. After curing the rubber, and allowing the mandrel to cool to room temperature, the cured rubber sleeve containing the test cords is cut into 1-inch wide rings which are then removed from the mandrel and placed on an undersized mandrel where they are slit axially through the rubber down to the cord layers but not deep enough to nick or damage the cords. The thus prepared "ring" is placed on a free-turning support in an Instron Tester and the loose end of the rubber cover is grasped with a clamp attached to the load cell of the Instron Tester. The average tension required to pull the rubber cover from the test cords in a 1-inch wide ring is reported in pounds per inch of width and is averaged for at least four samples.

In these examples, fatigue resistance was measured by either the "Disc Fatigue Test" or the "Firestone Compression Fatigue Test". In the "Disc Fatigue Test", which is similar to ASTM Method D-885, dipped cord is embedded in rubber to produce a 3 × ½ × ½ inch test sample. The sample is subjected to alternating compression and extension cycles at a rate of 2500 cycles per minute for a period of 24 or 72 hours at ambient temperature. The conditions of test are adjusted to give 12% compression and 6% extension.

In the "Firestone Compression Fatigue Test", dipped cords are embedded in a ¾ inch wide rubber strip having a steel wire reinforcing layer. The sample is bent over a ¼ inch diameter rod so the steel wire layer is under tension and the polyester cords are under compression. After flexing at a rate of 250 cycles per minute at 160° F. for various periods of time, the cords are stripped from the rubber and the tensile strength determined. The fatigue rating is the number of hours required for the cord strength to drop to 20 pounds per cord.

In these examples, the stiffness was measured by the "Gurley Stiffness Test" using an instrument sold by W. & L. E. Gurley Co., Troy, N.Y. This test is based on measuring the energy required to bend a "comb-shaped" sample of cords. In a precisely controlled manner, a plurality of 1 inch long cords are laid side-by-side for a 1 inch width and the ends are taped together with ¼ inch of the cords exposed like teeth in a comb. The sample is placed at the bottom of the path of a calibrated pendulum with the "teeth" extending upwardly. The stiffness of the cords is determined from the distance the pendulum travels after striking the "teeth" of the cord sample.

EXAMPLE 1

Polyethylene terephthalate having a solution IV of 0.88 was melt-spun through a 250-hole spinnerette at a rate of 380 grams per minute. Immediately after quenching and before convergence of the filaments, the open bundle of filaments was passed over a rotating finish roll ("kiss roll") wetted with a 40% solution of a mixture of aromatic isocyanates containing about 60% methylene-bis(4-phenylisocyanate), about 8% dimerized methylenebis(4-phenylisocyanate) or a total of 68% di-functional aromatic isocyanate, and about 32% polymethylene polyphenyl isocyanate of which 13% was tri-functional and 19% was higher than tri-functional aromatic isocyanate, in monochlorobenzene to give an isocyanate pick-up of 0.3% on weight of fiber. The filaments were then wound up as undrawn yarn on tubes. These tube packages of yarn were then transferred to a Dobson and Barlow draw twister where a hydroxy-containing lubricating finish comprising a sulfonated fatty acid-ethylene oxide copolymer, hexadecyl stearate, oleic acid, and a bactericide was applied to the yarn from a 5% solution in a 3:1 mixture of water:acetone from a kiss-roll applicator located between the pre-tension pin and the feed rolls to give a finish pick-up of 0.11% on weight of fiber, and the yarn was drawn to 5.2 times its undrawn length between heated godets across a heated platen to a twister pirn. (The following conditions were maintained: Feed Rolls temperature 180° F., speed 60.6 meters per minutes; Platen length 10–12 inches contact with yarn, temperature 385° F; Draw Rolls unheated, speed 315 meters per minute.) Subsequently, the yarn was twisted and plied to a 1000/250/2 ply—12S × 12Z cord construction. After application of the RFL dip, drying at 400° F. for 90 seconds, and testing by the Ring Peel Adhesion test previously described, an adhesion value of 86 pounds per inch width was obtained. These cords suffered only an 11.3% loss in strength after 72 hours of cycling in the Disc Fatigue Test. The dipped cords had a stiffness of 23.4 mg/cord as determined by the Gurley Stiffness Test. Drawability was rated as excellent with very few broken filaments.

EXAMPLES 2–13

Example 1 was repeated with various mixtures of aromatic isocyanates, keeping all other conditions the same. The results of the Ring Peel Adhesion test and the Gurley Stiffness Test and the drawability of the various mixtures is reported in Table I.

TABLE I

| Example | Isocyanate Mixture % di-functional | % tri-functional | % higher than tri-functional | Adhesion (lb/inch width) | Stiffness mg/cord | Drawability |
|---|---|---|---|---|---|---|
| 2 | 100 | 0 | 0 | 68 | 17.3 | Fair |
| 3 | 87.8 | 5.6 | 6.6 | 90 | 27.1 | Good |
| 4 | 75.5 | 11.2 | 13.3 | 84 | 28.4 | Good |
| 5 | 68.1 | 13.1 | 18.8 | 110 | 28.4 | Excellent |
| 6 | 63.2 | 16.7 | 20.1 | 98 | 28.4 | Good |
| 7 | 50.9 | 22.3 | 26.8 | 104 | 25.9 | Good |
| 8 | 50.9 | 22.3 | 26.8 | 83 | 34.5 | Good |
| 9 | 49.9 | 19.7 | 30.5 | 109 | 25.9 | Poor |
| 10 | 41.3 | 16.9 | 41.9 | 110 | 39.5 | very poor |
| 11 | 41.3 | 16.9 | 41.9 | could not be drawn | | |
| 12 | 41.3 | 16.9 | 41.9 | 124 | — | very poor |
| 13 | 41.3 | 16.9 | 41.9 | could not be drawn | | |

From the data in Table I, it is seen that use of more than 90% di-functional aromatic isocyanate produces cords having lower adhesion whereas use of less than 50% di-functional aromatic isocyanate results in filaments which either cannot be drawn or which can be drawn only with extreme difficulty. The cord of Example 10, when tested by the Disc Fatigue Test, suffered only a 5.4% loss in strength after 24 hours of cycling and an 8.8% loss in strength after 72 hours of cycling.

EXAMPLE 14

Polyethylene terphthalate having a solution IV of 0.88 was melt-spun through a 250-hole spinnerette at a rate of 380 grams per minute. Immediately after quenching and before convergence of the filaments, the open bundle of filaments was passed over a rotating finish roll ("kiss roll") wetted with a 36% solution of a mixture of aromatic isocyanates containing about 60% methylene-bis(4-phenylisocyanate), about 8% dimerized methylenebis(4-phenylisocyanate) or a total of 68% di-functional aromatic isocyanate, and about 32% polymethylene polyphenyl isocyanate of which 13% was tri-functional and 19% was higher than tri-functional aromatic isocyanate, in monochlorobenzene to give an isocyanate pick-up of 0.3% on weight of fiber. Immediately after the application of the isocyanate, a hydroxy-containing lubricating finish comprising a sulfonated fatty-acid-ethylene oxide copolymer, hexadecyl stearate, oleic acid, and a bactericide was applied to the filaments from a 5% solution in a 3:1 mixture of water::acetone from a "shoe" applicator to give a finish pick-up of 0.1% on weight of fiber. The filaments were then wound up was undrawn yarn on tubes. These tube packages of yarn were then transferred to a draw twister where the yarn was drawn to 5.2 times its undrawn length between heated godets across a heated platen to a twister pirn. (The following conditions were maintained: Feed Rolls temperature 180° F., speed 60.6 meters per minute; Platen length 10–12 inches contact with yarn, temperature 385° F.; Draw Rolls unheated, speed 315 meters per minute.) Subsequently, the yarn was twisted and plied to form a cord. After application of the RFL dip, drying at 400° F. for 90 seconds, and testing by the Ring Peel Adhesion test previously described, an adhesion value of 79 pounds per inch width was obtained. A Firestone Compression Fatigue rating of 18.4 hours for the strength of the cord to drop from 47.9 pounds per cord to 20 pounds per cord.

This example was repeated substituting an isocyanate mixture of 49.9% di-functional aromatic isocyanate, 19.7% tri-functional aromatic isocyanate, and 30.5% higher than tri-functional aromatic isocyanate (the same mixture as in Example 9) applied from a 36% solution in monochlorobenzene. The product had an adhesion value of 86 pounds per inch of width and gave a Firestone Compression Fatigue rating of only 8.7 hours for the strength of the cord to drop from 46.0 pounds per cord to 20 pounds per cord. This shows the critical nature of having at least 50% di-functional aromatic isocyanate present in the isocyanate mixture being applied.

We claim:

1. In the process, including a dry heat drawing step, of making filaments of synthetic linear condensation polyester useful as reinforcement for rubber articles wherein an organic isocyanate is applied to such filaments to improve the adhesion thereof to rubber, the improvement comprising applying, as the organic isocyanate, a mixture of 50 to 90% di-functional aromatic isocyanates, and the remainder higher than di-functional aromatic isocyanates, and then drawing said polyester filaments to 4 to 7 times their undrawn length after applying said mixture of aromatic isocyanates, said drawing step being dry heat drawing, performed by heating the filament in air in contact with a heated surface.

2. A process as defined in claim 1 wherein said mixture is applied as a solution in a chlorinated hydrocarbon solvent.

3. A process as defined in claim 1 wherein said mixture is applied in an amount of 0.05 to 5.0% on weight of fiber.

4. A process as defined in claim 2 wherein said chlorinated hydrocarbon solvent is selected from chlorobenzene, dichloroethylene, trichloroethylene, tetrachloroethane, and perchloroethylene.

5. A process as defined in claim 1 wherein said polyester is polyethylene terephthalate.

6. A process as defined in claim 1 including the step of applying a lubricating finish to the isocyanate-treated polyester filaments prior to drawing.

* * * * *